United States Patent [19]

Yoshida

[11] Patent Number: 4,936,699
[45] Date of Patent: Jun. 26, 1990

[54] TOY ACCESSORIES

[75] Inventor: Masamichi Yoshida, Omiya, Japan

[73] Assignee: Buncho Corporation, Tokyo, Japan

[21] Appl. No.: 285,615

[22] Filed: Dec. 16, 1988

[30] Foreign Application Priority Data

Jan. 28, 1988 [JP] Japan .............................. 63-10062[U]

[51] Int. Cl.⁵ .............................................. B43K 8/02
[52] U.S. Cl. .......................................... 401/48; 401/8; 446/26; 446/71; D11/3; D11/34; 63/11
[58] Field of Search .................... 446/26, 71, 465, 471; 63/11; 401/8, 48, 49, 88; D11/1, 3, 34

[56] References Cited

U.S. PATENT DOCUMENTS 4,678,451  7/1987  Ventura .............................. 446/471
4,768,987  9/1988  Usui et al. ............................ 446/71

Primary Examiner—Alan W. Cannon
Attorney, Agent, or Firm—Oblon, Spivak, McClelland, Maier & Neustadt

[57] ABSTRACT

A toy accessory has a plastic accessory base having plural engaging parts. At least two different ornamental parts made of a composition for writing which contains a polyolefin are attached to the base. The ornamental parts are simultaneously detachably engaged with the base via the plural engaging parts.

7 Claims, 1 Drawing Sheet

TOY ACCESSORIES

BACKGROUND OF THE INVENTION (1) Field of the Invention

The present invention relates to toy accessories having an ornamental part made of a composition for writing.

(2) Prior Art

Various toy accessories are known. They include, for example, bracelets, rings, brooches and hair ornaments produced by forming an ornament in the shape of, for example, a heart, star, flower, butterfly or an animal such as a bear or panda and mounting it on a metal or plastic base by means of an adhesive. Further those produced by integral molding of a plastic to form the base and the ornamental part simultaneously and then coloring the ornamental part and also those solely made of metal are also known.

However, the person who wears these toys does so to merely enjoy their unique shape and prettiness.

SUMMARY OF THE INVENTION

Therefore, the object of the present invention is to provide toy accessories to be worn on the body not only for pleasure but also for realizing another function, whereby the toy accessories can be enjoyed in diverse ways.

The present invention has been completed on the basis of the findings that when plural ornamental parts made of a special composition for writing are simultaneously detachably mounted on a base, the ornamental part can be taken off and used as tools for writing figures or letters and that their arrangement can be changed to provide various kinds of enjoyment.

The present invention provides toy accessories comprising a plastic accessory base having an engaging means and an ornamental part made of a composition for writing which contains a polyolefin, the ornamental part being detachably engaged with the base.

DESCRIPTION OF THE PREFERRED EMBODIMENT

Figure 1:
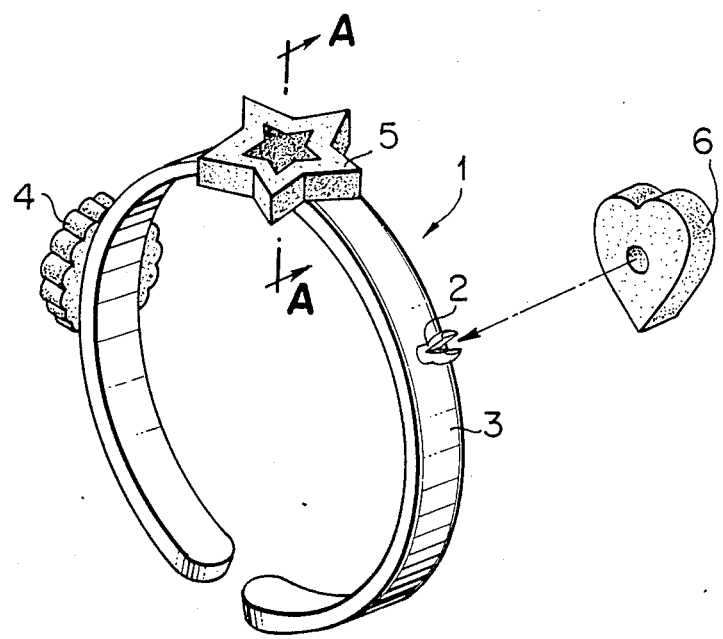
FIG. 1 is a perspective view of a toy bracelet of the present invention a part of which is taken off.

The plastic base of the accessories of the present invention having the engaging means can be formed from any of thermoplastic resins, thermoplastic elastomers and thermosetting plastics. Among them, the thermoplastic resins such as polyethylene, polypropylene, polystyrene, polyvinyl chloride and polyesters are preferred. The base can be formed from such a starting material without coloring or after coloring with a colorant such as a pigment.

The writing composition that is employed in the present invention may be a polyolefin containing a wax, a lubricant and a coloring agent. Practically, the writing composition comprises 25 to 80 weight % (hereinafter all weight percentages are referred to merely as %), preferably, 35 to 70%, of a polyolefin such as polyethylene or polypropylene, 5 to 60%, preferably, 15 to 50%, of a wax, and the balance of a coloring agent. The polyethylene or polypropylene used herein has a melt-flow rate (hereinafter referred to as MFR) of preferably 4 to 55 g/10 min and a density of 0.94 g/cm$^3$ to 0.91 g/cm$^3$. With the above-described amount of polyolefin, it is possible to provide the ornamental part of the toy with high strength and flexibility. The wax may be a natural wax such as carnauba wax, Japan wax, montan wax, paraffin wax or microcrystalline wax, or a synthetic wax such as a fatty acid (such as oleic acid or stearaic acid), its salt (such as calcium oleate, calcium stearate, magnesium oleate, magnesium stearate, aluminium oleate or aluminium stearate), a fatty acid amide, a ketone wax (such as distearyl ketone) or a polyethylene wax.

Any coloring agent usually employed in crayon, pastel or pencil compositions can be employed. Among them, preferable coloring agents include inorganic pigments such as titanium dioxide, black iron oxide, yellow iron oxide, red iron oxide, ultramarine, prussian blue, zinc white, alumina white, carbon black, aluminum powder, bronze powder or mica. Organic pigments preferably employed include: a nitroso or a nitro pigments such as Naphthol Green or Naphthol Yellow; azolake pigments such as Lithol Red, Lake Red C, Brilliant Carmine 6B, Watchung Red or Bordeaux 10B; insoluble azo pigments such as Fast Yellow, Disazo Yellow, Pyrazolone Orange, Para Red, Lake Red 4R or Naphthol Red; condensed azo pigments such as Chromophthal Yellow or Chromophthal Red; dyed lake pigments such as Peacock Blue Lake, Alkali Blue Lake, Rhodamine Lake, Methyl Violet Lake or Malachite Green Lake; phthalocyanine pigments such as Phthalocyanine Blue, Fast Sky Blue or Phthalocyanine Green; threne pigments such as Anthrapyrimidine Yellow, Perynon Orange, Perylene Red, Thioindigo Red or Indanthrone Blue; quinacridone pigments such as Quinacridone Red or Quinacridone Violet; dioxazine pigments such as Dioxazine Violet; isoindolenone pigments such as Isoindolenone Yellow; and fluorescent pigments. If the inorganic pigment is employed as a coloring agent, it may be added in an amount of 5 to 40%, more preferably, 10 to 25%. In the case of the organic pigment, the amount added may be 1 to 15%, more preferably 2 to 10%. With the wax and the coloring agent used in the above-described amounts, the resulting toy is capable of exhibiting adequate writing characteristics. In addition, 30% or less of an extender pigment such as talc, kaolin clay, calcium carbonate or magnesium silicate may also be added as a bulking agent. When the amount of extender pigment added exceeds 30%, the writing characteristics will be impaired.

According to the present invention, the above-described plastic or colored composition may be formed into any shape usable as an accessory base and ornamental part by a known molding method such as injection molding method. The wall thickness of the ornamental part is between 3 and 30 mm, preferably between 4 and 15 mm. This part is preferably provided with at least one corner conveniently usable for writing.

Figure 2:
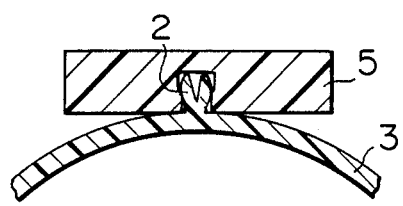
FIG. 2 is a cross section along a line A—A of FIG. 1.
Figure 3:
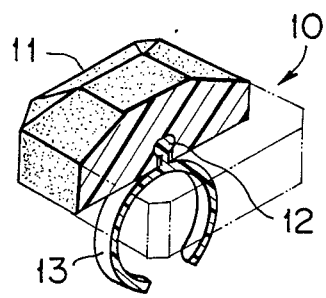
FIG. 3 is a half section perspective view of a toy ring of the present invention.

The molds are preferably so designed that the accessory base has at least one engaging projection such as a projection 2 as shown in FIG. 2 or engaging projection 12 having a spherical top as shown in FIG. 3 and that the ornamental part has a hole so that the projection 2 can be detachably fixed into the hole. Alternatively, the ornamental part may have the engaging projections and the base may have the holes.

The present invention will be described in detail with reference to the accompanying drawings.

FIG. 1 is a perspective view of a toy bracelet 1 of the present invention a part of which is taken off. The toy bracelet 1 comprises a polyethylene base 3 having an engaging projection 2 detachably engaged with ornamental parts 4, 5 and 6 made of a composition for writing which comprises a polyolefin. The ornamental parts 4, 5 and 6 each have a hole 7 having such a size that the engaging projection 2 can be detachably engaged therewith. As shown by an arrow, the projection 2 is inserted into the hole 7 of the ornamental part 6 to engage them with each other as shown in FIG. 2 (section along a line A—A in FIG. 1). FIG. 3 shows a toy ring of the present invention.

The toy accessories of the present invention are basically constructed in the above-described manner. However, a piece of paper may be applied to a part of the base or ornamental part or the accessories may be decorated with a pattern.

According to the present invention, toy accessories having a sufficient strength can be obtained. The ornamental parts of them can be detached and used for writing letters or drawing pictures on a sheet of paper. Thus fun of an unconventional type can be enjoyed.

Therefore, when the ornamental parts of various colors such as red, blue, yellow and green are provided to make a set, they can be used as a set of colored pencils. They can also advantageously help infants learn how to write letters or draw pictures while they are playing with them, since they will still function as toy accessories.

Since the ornamental parts are detachable, they can be replaced with other parts having different colors and shapes. When the base has several engaging projections, the order of the arrangement of the ornamental parts can be changed. This is fun for children.

Thus the toy accessories of the present invention are widely usable as bracelets, rings, brooches, pendants, necklaces, hair ornaments, tiepins, cuff buttons, etc.

The following examples will further illustrate the present invention, which by no means limit the invention.

EXAMPLE 1

The following components were kneaded with a kneader at 120° C. for 1 h, pressed, cooled and then ground. The resulting material was injection-molded into a red ornament 4 of a toy accessory as shown in FIG. 1.

| | |
|---|---|
| Low-density PE (MFR: 20 g/10 min, density: 0.918 g/cm$^3$) | 30% |
| Polyethylene wax (m.p. 105 to 115° C.) | 15% |
| Paraffin (m.p. 55 to 58° C.) | 18% |
| Stearic acid amide | 12% |
| Calcium stearate | 4% |
| Lanolin | 8% |
| Brilliant Carmine 6B | 8% |
| Magnesium carbonate | 5% |

An ornament 5 (yellow) and ornament 6 (blue) were produced in the same manner as above except that Brilliant Carmine 6B was replaced with Hansa Yellow 10G and Phthalocyanine Blue, respectively.

Separately, polypropylene having an MFR of 14 g/10 min and density of 0.91 g/cm$^3$ was injection-molded to form the ring shaped accessory base 3 having the engaging projection 2. The ornaments 4 to 6 were mounted on the base 3 by means of the engaging projection 2 to form a toy bracelet 1.

The bracelet thus produced had a strength sufficient for the toy. Red, yellow and blue letters could be easily written on a sheet of drawing paper with the ornaments 4 to 6 taken off from the base.

EXAMPLE 2

A toy jewel 11 (green) as shown in FIG. 3 was produced in the same manner as that of Example 1 except that the composition for writing was replaced with the following composition:

| | |
|---|---|
| Low-density polyethylene (MFR: 50, density: 0.928 g/cm$^3$) | 40% |
| Paraffin (m.p. 55 to 58°) | 12% |
| Hardened oil (m.p. 53 to 56° C.) | 5% |
| Distearyl ketone | 10% |
| Zinc stearate | 10% |
| Ethylene vinyl acrylate | 3% |
| Talc | 5% |
| Lubricating oil | 8% |
| Phthalocyanine Green | 7% |

The jewel 11 was mounted on the ring shaped base 13 by means of the engaging projection 12 to form a toy ring 10 as shown in FIG. 3. The toy jewel 11 was taken off. Green letters could be easily written with it on a sheet of drawing paper.

What is claimed is:

1. Toy accessories comprising a plastic accessory base having plural engaging means and at least two different ornamental parts made of a composition for writing which contains a polyolefin, the ornamental parts being simultaneously detachably engaged with the base via said plural engaging means.

2. Toy accessories according to claim 1, wherein the base is formed from a plastic selected from the group consisting of thermoplastic resins, thermoplastic elastomers and thermosetting plastics.

3. Toy accessories according to claim 2, wherein the thermoplastic resins are selected from polyethylene, polypropylene, polyester, polyvinyl chloride and polystyrene.

4. Toy accessories according to claim 1, wherein the composition for writing comprises 25 to 80 weight % of polyolefin, 5 to 60 weight % of wax and balance of coloring agent.

5. Toy accessories according to claim 1 wherein said base is ring shaped.

6. Toy accessories according to claim 1 wherein each of said ornaments has a different color.

7. Toy accessories comprising:
    (a) a plastic accessory base comprising means for attaching said accessories to a person and having an engaging means, and
    (b) an ornamental part made of a composition for writing which contains a polyolefin, the ornamental part being detachably engaged with the base.

* * * * *